United States Patent
Müller et al.

(10) Patent No.: US 11,809,900 B2
(45) Date of Patent: Nov. 7, 2023

(54) METHOD AND SYSTEM FOR MIGRATION OF CONTAINERS IN A CONTAINER ORCHESTRATION PLATFORM BETWEEN COMPUTE NODES

(71) Applicant: Siemens Aktiengesellschaft, Munich (DE)

(72) Inventors: Harald Müller, Seefeld-Hechendorf (DE); Sreenath Premnadh, Unterhaching (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 192 days.

(21) Appl. No.: 16/965,126

(22) PCT Filed: Dec. 10, 2018

(86) PCT No.: PCT/EP2018/084198
§ 371 (c)(1),
(2) Date: Jul. 27, 2020

(87) PCT Pub. No.: WO2019/149414
PCT Pub. Date: Aug. 8, 2019

(65) Prior Publication Data
US 2021/0042151 A1    Feb. 11, 2021

(30) Foreign Application Priority Data
Feb. 1, 2018   (EP) .................... 8154620

(51) Int. Cl.
*G06F 9/455*   (2018.01)
*G06F 9/48*    (2006.01)
*G06F 9/50*    (2006.01)

(52) U.S. Cl.
CPC ........ *G06F 9/4856* (2013.01); *G06F 9/45558* (2013.01); *G06F 9/5088* (2013.01); *G06F 2009/4557* (2013.01)

(58) Field of Classification Search
CPC ................................................... G06F 9/45558
(Continued)

(56) References Cited

U.S. PATENT DOCUMENTS 10,191,778 B1 * 1/2019 Yang .................. G06F 11/301
10,484,301 B1 * 11/2019 Shukla ................ H04L 41/0896
(Continued)

FOREIGN PATENT DOCUMENTS

| CN | 105607954 A | 5/2016 |
| WO | WO 2017064554 A1 | 4/2017 |
| WO | 2017166513 A1 | 10/2017 |

OTHER PUBLICATIONS

PCT International Search Report dated Jan. 31, 2019 and corresponding to PCT International Application No. PCT/EP2018/084198 filed on Dec. 10, 2018.

(Continued)

*Primary Examiner* — Mehran Kamran
(74) *Attorney, Agent, or Firm* — Schmeiser, Olsen & Watts LLP

(57) ABSTRACT

A method for migration of containers in a container orchestration platform, such as Kubernetes or Docker swarm, between compute nodes of a seamless computing platform present in different computing domains is provided. The state of the compute nodes of the seamless computing platform is continuously monitored. On determining a trigger, a container to be moved from a current compute node to a target compute node of a number of compute nodes is identified. A container information of the container to be moved is generated which includes a container context and (Continued)

the current state of the container. The container information is used by the target node to retrieve the current state of the container to be moved which enables restarting the container on the target compute node.

16 Claims, 2 Drawing Sheets

(58) Field of Classification Search
USPC .............................................................. 718/1
See application file for complete search history.

(56) References Cited

U.S. PATENT DOCUMENTS

| | | | | |
|---|---|---|---|---|
| 10,922,123 | B2* | 2/2021 | Smith, IV | G06F 9/45558 |
| 2013/0326507 | A1* | 12/2013 | McGrath | G06F 9/4856 |
| | | | | 718/1 |
| 2016/0150010 | A1* | 5/2016 | Takase | G06F 3/067 |
| | | | | 709/219 |
| 2016/0217050 | A1* | 7/2016 | Grimm | G06F 11/203 |
| 2016/0285958 | A1* | 9/2016 | Das | G06F 9/45504 |
| 2016/0330277 | A1* | 11/2016 | Jain | H04L 67/1095 |
| 2016/0378563 | A1* | 12/2016 | Gaurav | G06F 9/45558 |
| | | | | 718/1 |
| 2017/0063722 | A1* | 3/2017 | Cropper | G06F 9/5061 |
| 2017/0126432 | A1* | 5/2017 | Padala | H04L 43/08 |
| 2017/0244787 | A1* | 8/2017 | Rangasamy | H04L 67/10 |
| 2018/0004555 | A1* | 1/2018 | Ramanathan | G06F 9/45558 |
| 2018/0020077 | A1* | 1/2018 | Folco | G06F 9/50 |
| 2018/0024889 | A1* | 1/2018 | Verma | G06F 9/445 |
| | | | | 714/15 |
| 2018/0060091 | A1* | 3/2018 | Ciano | G06F 9/452 |
| 2018/0074748 | A1* | 3/2018 | Makin | H04L 67/142 |
| 2018/0102985 | A1* | 4/2018 | Byers | H04L 47/80 |
| 2018/0349199 | A1* | 12/2018 | Vyas | G06F 9/5083 |
| 2019/0050272 | A1* | 2/2019 | Liu | H04L 41/0836 |
| 2019/0179720 | A1* | 6/2019 | Chen | G06F 11/203 |
| 2019/0191344 | A1* | 6/2019 | Wen | G06F 9/45558 |
| 2020/0117494 | A1* | 4/2020 | Cortez | G06F 9/4856 |
| 2020/0192689 | A1* | 6/2020 | Smith, IV | G06F 16/178 |
| 2021/0042151 | A1* | 2/2021 | Müller | G06F 9/5083 |
| 2021/0109778 | A1* | 4/2021 | Keating | G06F 9/4856 |

OTHER PUBLICATIONS

Communication pursuant to Article 94(3) EPC dated Jan. 15, 2019 for Application No. 18154620.1.
Extended European search report dated Jul. 16, 2018 for Application No. 18154620.1.
Summons to attend oral proceedings pursuant to Rule 115(1) EPC issued May 27, 2019 for Application No. 18154620.1.

* cited by examiner

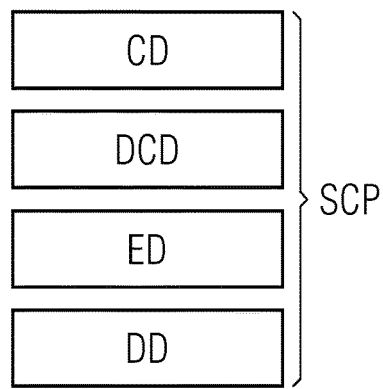
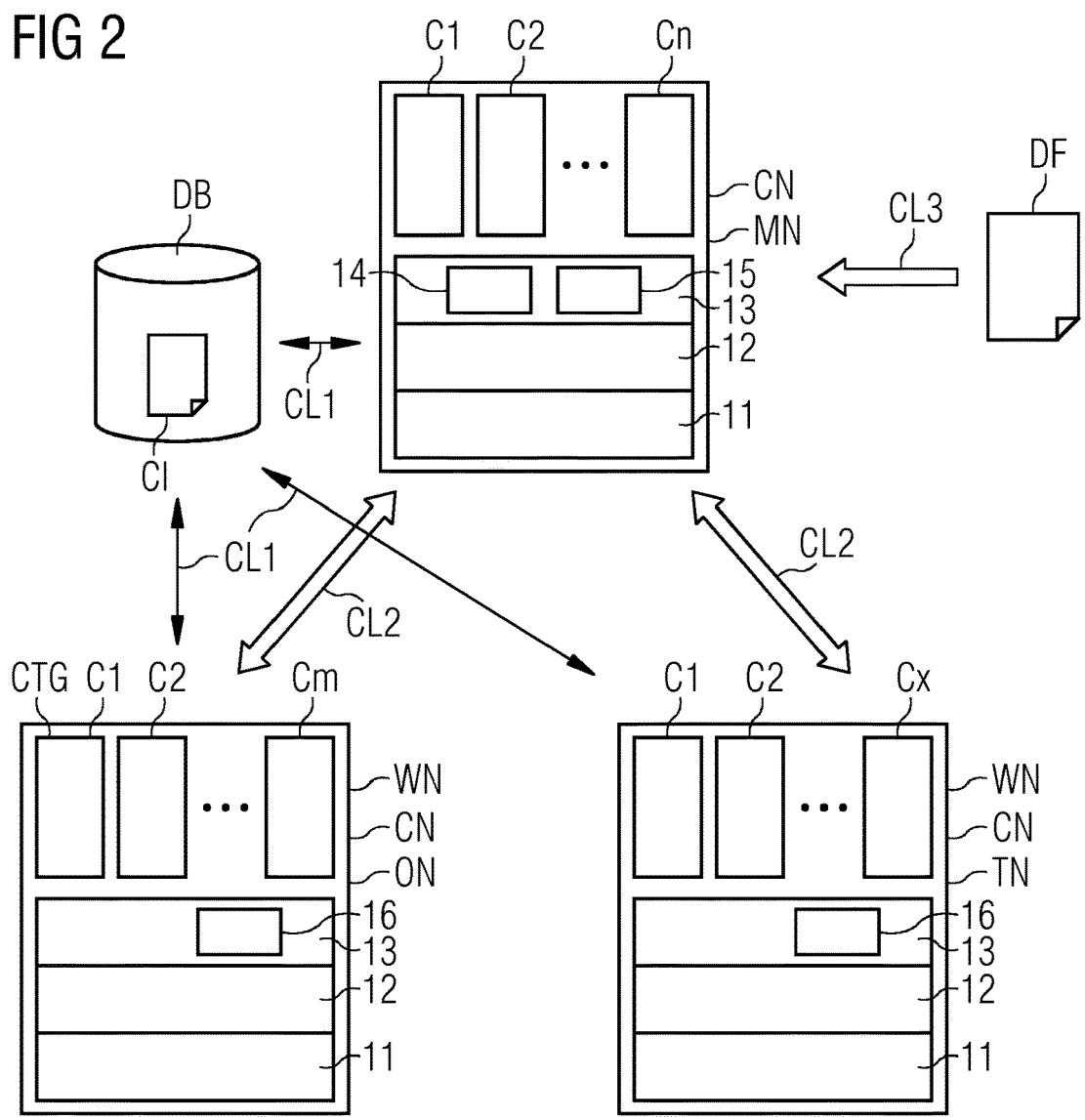

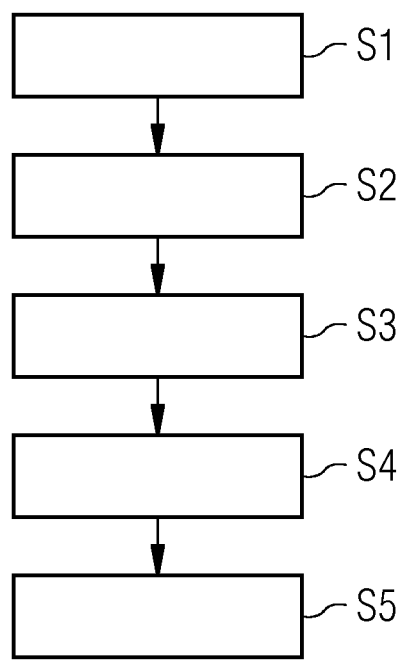

METHOD AND SYSTEM FOR MIGRATION OF CONTAINERS IN A CONTAINER ORCHESTRATION PLATFORM BETWEEN COMPUTE NODES

CROSS-REFERENCE TO RELATED APPLICATIONS

This application claims priority to PCT Application No. PCT/EP2018/084198, having a filing date of Dec. 10, 2018, which is based on EP Application No. 18154620.1, having a filing date of Feb. 1, 2018, the entire contents both of which are hereby incorporated by reference.

FIELD OF TECHNOLOGY

The following relates to a method and a system for migration of containers in a container orchestration platform between compute nodes of a seamless computing platform.

BACKGROUND

In industrial systems software is present across several compute domains, from decentralized edge to centralized datacenters and clouds. As long as there is no homogeneous and seamless environment to build, deploy and operate the software across the several domains, this leads to a separation, inefficient processes, and duplicate efforts to provide software that runs across the different layers. The so-called seamless computing provides a seamless computing environment for multi-domain applications, supporting the mobility of workloads between cloud and edge as well as the device domain. Seamless computing is based on transferring established, de-facto standard cloud computing technologies to resource-constrained compute environments in the edge.

A seamless computing platform SCP, as shown in FIG. 1, consists of computing systems in different layers or domains. Each layer or domain has typical characteristics and can have different hardware/CPU architectures and operating systems. The seamless computing platform SCP provides a uniform platform for deploying tasks and applications over these different node clusters.

The cloud domain CD is the most abstracted and standardized computing environment. Cloud providers offer virtually unlimited compute and storage capacities on demand, allowing for elasticity and scalability of applications deployed in that domain. With cloud computing, technologies like cloud orchestration, and continuous delivery have emerged. Cloud services may be highly centralized and offered from a few hyper-scale datacenters. This means, that there is always a certain distance and thus latency to on-premise field devices, restricting real-time applications. Often, resources are shared among different users.

The datacenter domain DCD comprises a large number of general purpose servers. It is common for lots of companies to run their backend IT applications in such datacenters. The datacenters may be operated by the company itself, or by an IT operator on behalf of the company. While initially, datacenters were based on physical servers, virtualization is being used to be more flexible in mapping application demand to existing server capacity. It is possible to build private clouds using cloud technologies to manage virtual machines, which enables more dynamic changes and self-service through automation. The datacenters may be spread across several sites of a company, which are connected using private networking equipment or virtual private networks. The datacenter domain DCD provides a certain degree of resource pooling with a large but not unlimited amount of compute and storage resources. Since they are a part of the private network of a company, the environment is considered controllable and more secure than public clouds.

Computing devices in the edge domain ED usually consist of general purpose hardware and standard operating systems. Edge nodes are located, e.g., at the end of a production line in an industrial plant, or in a substation of an electrical transmission or distribution grid, and connect to the field devices. The edge domain ED within a single site can consist of a single computer up to a smaller number of nodes, ranging from industry PCs to workstations or servers.

The device domain DD is the computing domain that is closest to the managed physical systems. Traditionally, and even still today, computing there is often based on dedicated embedded hardware with limited resources in terms of compute and storage power. Field devices have direct access to the physical devices, usually sensors and actuators. Often, they have to carry out tasks under real-time constraints. At the same time, field devices often act in physical systems that are an integral part of mission critical processes or infrastructure, like energy systems, industrial processes, or public infrastructure like traffic systems. The software running on field devices often uses low level programming languages, in the simplest case even without an operating system.

The seamless computing platform SCP overcomes the issue that the different domains use completely different software environments, with different methods and tools for implementing, deploying and operating the software, leading to static assignment of system functionality to the different layers. In a seamless computing platform SCP identical software environments across the compute domains are implemented, providing consistent tools and technologies for design, deployment, testing, deploying, and running software to support multi-domain applications.

Container orchestration platforms, like Kubernetes and Docker Swarm, statically allocate containers on different computing instances or nodes. Container orchestration platforms take into consideration relative loads on the system while allocating containers initially. They can be used, e.g., in the seamless computing platform SCP according to FIG. 1. A common feature of known container orchestration platforms is that the containers once assigned to a computing instance are static. That is, a container cannot be moved to a different node unless there is a failure in the current node. In particular, they do not relocate the containers based on the changing loads in these compute nodes. As the compute nodes can also execute applications which are not managed by the orchestration system, the load on the system the container orchestration platform is providing service to can also change. The system may be the seamless computing platform SCP according to FIG. 1, where for example, compute nodes in the edge domain ED would need to have resources freed to execute real-time tasks with high priority.

SUMMARY

An aspect relates to a method and a system to run a seamless computing platform with enhanced flexibility.

According to a first aspect, a method for migration of containers in a container orchestration platform between compute nodes of a seamless computing platform is suggested. The compute nodes of the seamless computing platform may be physical nodes or virtual nodes. The method comprises the step of continuously monitoring, by a central master node or distributed among the compute nodes, the state of the compute nodes of the seamless computing platform and/or of performance metrics of the running applications. As a further step, on determining a trigger, identifying a container to be moved from a current compute node to a target compute node of a number of compute nodes is carried out. According to a further step, a container information of the container to be moved is generated, the container information at least comprising a container context and the current state of the container to be moved. As a further step, the container information is processed to retrieve the container to be moved and its current state. Finally, the container is restarted on the target compute node with its current state when generating the container information.

According to a second aspect of embodiments of the invention, a system for migration of containers in a container orchestration platform between compute nodes of a seamless computing platform is suggested. The system comprises a central master node for continuously monitoring the state of the compute nodes of the seamless computing platform. The system further comprises a first compute node, optionally being the master node, for identifying a container to be moved from a current compute node to a target compute node of a number of compute nodes on determining a trigger. Furthermore, the system comprises a second compute node, optionally being the current compute node, for generating a container information of the container to be moved, the container information at least comprising a container context and the current state of the container to be moved. In addition, the system comprises a third compute node, optionally being the target compute node, for processing the container information to retrieve the container to be moved and its current state. The target compute node is adapted for restarting the container on it with its current state when generating the container information.

The first compute node, the second compute node and the third compute node need not to be physical compute nodes. Instead, each of them may be a functional component, such as a scheduler (first compute node), a state backup (second compute node) or a state restore (third compute node).

Using this approach, the file system of the container to be moved can be saved and restored in a different node. It is not necessary to save the state of the physical memory of the container as well as process execution stages. Instead, the relevant state of the container to be moved is saved. This information is used by the target node to restart the container on the target compute node.

Embodiments of the invention enables the movement of containers in a seamless computing platform during runtime. There is no restriction with regard to the time or the circumstances of the movement of a container. In particular, it is not necessary to wait until the end of the execution of the container or until some failure causes the compute node, on which the container is running, to crash. As a result, relocation of containers at runtime is enabled in a seamless computing platform.

The central master node may be a compute node which is adapted to execute one or more containers. Alternatively, the central master node may be a compute node which is not used to execute a container. According to an embodiment, the current compute node and/or target compute node may be different from the central master node. As a result, the container to be moved may be moved from one compute node to another compute node which both are not the central master node. Alternatively, the container to be moved may be moved from a compute node to the master node. As a further alternative, a container to be moved may be moved from the master node to another compute node.

According to a preferred embodiment, the container information is generated by the compute node from which the container has to be moved and/or the container to be moved. For stateless containers it is not required to save the state of the container. The container context is sufficient. For stateful containers, the file system and the physical memory need to be saved. The file system may be saved from the compute node. Saving the physical memory may be done by the container itself (e.g. based on a trigger). According to this embodiment, the container information is generated decentralized, i.e. from that compute node which has the information about the current state of the container to be moved. As a result, the amount of data which has to be transferred within the seamless computing platforms and across different compute nodes for performing the migration of a container can be kept low.

According to a further preferred embodiment, the step of generating the container information comprises saving the container information in a storage that can be accessed by all computer nodes of the seamless computing platform. Hence, independent from the knowledge which of the compute nodes will be the target node to which the container to be moved will be migrated, the container information is centrally available. As a result, the container information can be retrieved by the designated target node, which needs the container information for restarting the migrated container. The storage may be a central storage or a distributed storage.

According to a further preferred embodiment, the step of generating the container information comprises generating a reference information about a storage location of the container information. The reference information is an information about the location where the state of the container is stored. Compared to the container information the reference information needs a smaller amount of memory space for storing and transferring within the seamless computing platform. As such, the reference information can be regarded as a pointer to the storage location in the storage, which is accessible by all compute nodes.

According to a further preferred embodiment, the reference information is transferred from the compute node from which the container has to be moved to the central master node. On receiving the reference information the central master node may establish a procedure to find a suitable target node for restarting the container to be moved. After the master node has found a suitable target node, the reference information is transferred to the target node.

According to a further preferred embodiment, the step of continuously monitoring the state of the compute nodes comprises acquiring one or more of the following information: a respective work load of each of the compute nodes; resources needed to execute the container to be moved; migration costs associated with the migration of the container to be moved to find the target compute node; mismatch of the application performance with a defined quality of service (QoS) target, which could be response time, latency, etc. The master compute node takes into consideration at least one of the above mentioned information to find a suitable target node. A compute node which matches that constraints best will be the designated target node for the container to be moved.

According to a further preferred embodiment, the trigger is caused by one of the compute nodes. According to this embodiment, each of the compute nodes monitors the load on it. The load of the compute node may change as it may execute applications which are not under the control of the container orchestration platform or the applications under the control of the container orchestration platform behave in an unexpected way or are somewhat unpredictable. A trigger might be sent to the master node, indicating that the compute node a container is running on, may run out of its resources.

Alternatively, the trigger may be caused by a master node. The master node may, for example, allocate a real-time application on one of the current compute nodes such that there is the need to move a container currently running on the current compute node to establish the resources needed for the real-time application.

The trigger may be created due to continuously monitoring the state of all compute nodes of the seamless computing platform. This allows to dynamically arrive at an optimized utilization of the resources of the seamless computing platform.

According to a further preferred embodiment, the step of restarting the container on the target compute node is carried out by the target compute node upon receiving a start command, comprising the container information and/or the reference information, from the master node. By receiving the start command, comprising the container information and/or the reference information the target node is able to retrieve the current state of the container to be moved from the current node. Retrieving the container itself may be done by a deployment file which will be received from the master node, e.g. as part of the container information, as well. Having this information, the target node can restart the container.

According to a further preferred embodiment, the target node sends a confirmation to the master node after it has started the container. The container to be moved is stopped on the previous compute node upon receiving a stop command from the master node.

According to a further preferred embodiment, the master node runs an agent process for communicating with the current and the target compute nodes. The current and the target compute nodes may run an agent process to receive and execute instructions from the master node. The agent processes running on the master node and the other compute nodes enable an easy and efficient communication for executing the movement (migration) of a container at runtime.

According to a third aspect, a piece of software for executing the steps of the method mentioned herein when run on a seamless computing platform is proposed. The piece of software may be stored, for example, on a storage medium, such as a DVD, a CD-ROM or a memory stick. The piece of software may be loadable via a wireless or wired network as well.

With embodiments of the invention, it is possible to save a file system or relevant parts of a container of a container orchestration platform and restore the container on a different compute node. The container orchestration platform may be implemented on a seamless computing platform consisting of several domains, like cloud domain, datacenter domain, edge domain and device domain.

The state of the physical memory of a container to be moved and its process execution stages need not to be saved. Instead, a signal sent by the compute node from which a container is to be moved informs about its move. This compute node and/or the container then saves the relevant state of the container. After that, the move of the container is initiated by a communication between this compute node and a master node where the latter finds a suitable target node.

BRIEF DESCRIPTION

Some of the embodiments will be described in detail, with reference to the following figures, wherein like designations denote like members, wherein:

FIG. 1 shows a seamless computing platform consisting of different domains;

FIG. 2 shows a schematic drawing of a system for migration of containers in a container orchestration platform between compute nodes of a seamless computing platform; and FIG. 3 shows a flow chart of a method for migration of containers in a container orchestration platform between compute nodes CN of a seamless computing platform.

DETAILED DESCRIPTION

FIG. 2 shows a system for migration of containers in a container orchestration platform between compute nodes CN of a seamless computing platform SCP as illustrated in FIG. 1 and described in the introductory part. By way of example only, three compute nodes CN are illustrated. One of the compute nodes CN is a central master node MN, the other two compute nodes CN can be regarded as client or worker nodes WN. One of the worker nodes WN constitutes a current compute node (or originating node) ON and the other of the worker nodes WN constitutes a target compute node (or destination node) TN.

Each of the compute nodes CN may be a physical entity or a virtual node provided by a virtual machine running on an arbitrary hardware component of the seamless computing platform SCP. The compute nodes CN, as outlined in FIG. 2 may be compute nodes of one of the domains CD, DCD, ED, DD of the seamless computing platform SCP or spread over different domains. For example, the central master node MN may be a compute node CN of the data center domain DCD while the current node ON is a compute node CN of the edge domain ED and the target compute node TN is a compute node CN of the cloud domain CD.

For the following description, it is assumed that the compute nodes CN (being the central master node MN or the worker nodes WN) are constituted as physical compute nodes.

Hence, each of the compute nodes CN consists of a hardware 11, on which an arbitrary operating system 12 is running. To implement a container orchestration platform, such as Kubernetes or Docker Swarm, a container runtime environment 13 is running on the operating system 12. An amount m of containers C1, . . . , Cm is running on the current compute node ON. An amount x of containers C1, . . . , Cx is running on the target compute node TN. As shown in FIG. 2, an amount n of containers C1, . . . , Cn is running on the central master node MN, although this is only an option. The amounts m, n, x of containers in the different compute nodes depends on the resources provided by the compute nodes CN and the resources needed by a respective one of the containers. Hence, the amounts m, n, x can be different or equal. In contrast to the illustration of FIG. 2, it is not necessary that the compute nodes CN host have a plurality of container. Instead, only one container (i.e. m=1 and/or n=1 and/or x=1) could be hosted as well.

It is apparent that embodiments of the invention as described herein may be carried out in a seamless computing platform SCP which consists of more than three compute nodes. Moreover, the presented approach could be used with only two compute nodes, where one of the compute nodes CN acts as the central master node MN and the current compute node ON or the target compute node TN at the same time.

The structure shown in FIG. 2 is similar to the structure employed by any known container orchestration platform like Kubernetes or Docker Swarm.

The central master node MN has two system processes 14, 15, that could run as containers in the container runtime environment 13. A controller process 14 initially schedules the containers C1, ..., Cm, C1, ..., Cx and C1, ..., Cn on the different compute nodes CN during deployment. An agent process 15 communicates with the worker nodes WN. The agent process 15 also runs an API (Application Programming Interface) server for a user request.

The worker nodes WN, i.e. the current compute node ON and the target compute node TN, consist of just an agent process 16 running on their container runtime environment 13. The agent process 16 of each worker node WN gets instructions from the central master node MN and executes them. The agent process 15 of the central master node CN and the agent processes 16 of the worker nodes WN may exchange data via a communication link CL2.

In addition to the compute nodes CN a data base DB is provided. The data base DB represents a storage which can be run on a further compute node. In particular, the data base DB could be part of the compute node CN constituted by the central master node MN. The compute nodes CN (i.e. the central master node MN, the current compute node ON and the target compute node TN) can access the data base DB via a communication link CL1. Alternatively, the data base DB may be distributed over several compute nodes.

A so-called deployment file DF containing all information needed to install and run a container can be loaded into the central master node MN via a third communication link CL3.

In such a setup it is possible that, for example, the current node ON runs out of its resources, either memory or CPU computing power, while executing the containers C1, ..., Cm which are part of user deployments obtained from the central master node MN. In such a situation, by moving one or more containers from the current node ON to another node (in the example to the target node TN which is ought to have sufficient resources for his containers C1, ..., Cx and further containers) would enable to run the seamless computing platform with continued high efficiency.

A movement of one or more containers between compute nodes (and domains if the compute nodes CN are spread over different domains) is conducted at runtime. In the container orchestration platform, as outlined in FIG. 2, the movement may be accomplished with the following steps:

1. Initiation of a movement of one or more containers is a trigger event. The trigger may be caused from the central master node, for example, when the current node ON is supposed to manage a real-time task which requires dedicated resources which can be only provided if one or more non-real-time tasks executed by one or more containers are moved. A further trigger caused from the central master node MN could be an optimization process for all the compute nodes CN of the seamless computing platform SCP. In that case the movement of different containers between the compute nodes CN could be made such that the load of all compute nodes CN is around equally. The master node can get this information from continuously monitoring the state of the platform on various metrics like relative load on the nodes, network traffic etc. There are tools like Grafana for Kubernetes that provides this information.

Alternatively, the trigger event could be initiated by the current node ON itself, e.g. if a worker node ON runs out of resources, either memory or CPU computing power while executing the containers C1, ..., Cm. Running out of resources can occur if further tasks are executed by the current node which are not controlled by the orchestration platform.

2. The current node ON from which a container CTG has to be moved may be called an originating compute node ON. The node agent 16 of the current compute node ON identifies a container CTG to be moved based on the resources that need to be freed and the resource consumption of the remaining containers. In the present example, container C1 is regarded to be the container CTG to be moved while the remaining containers C2, ..., Cm will be kept running on the current compute node ON.

In an implementation example, the containers might be Docker containers in case that Docker swarm is used as an orchestration platform. By using the command "docker stats" the resource consumption of the containers can be obtained.

3. For proceeding movement, the agent process 16 of the current compute node ON needs to have an information of a suitable destination node. Therefore, the node agent 16 of the current compute node ON sends a request to the agent process 15 of the central master node (master agent) with a specification of the container CTG to be moved. In this request grant of a suitable destination node is requested. To find a suitable destination node, the agent process 15 of the central master node MN takes into consideration the current state of the system with all its compute nodes CN and the workloads assigned to them, the resources needed to execute the container CTG and the migration costs associated with migrating the container CTG, for calculating a suitable destination node for the container CTG. In the present example, the target node TN is regarded to be the destination node identified by the agent process 15 of the central master node MN.

4. The agent process 15 of the central master node MN then instructs the current compute node ON to save the current state of the container CTG. It is to be noted that saving the current state of the container CTG is not necessary if the container CTG is stateless. In that case all information for restarting the container could be taken from the deployment file DF. In case of using Docker containers, the commands "docker save" can be used to save the current status of the container CTG. The current status can be committed as a container information CI to a central repository, i.e. the database DB, using the command "docker commit".

The agent process 16 of the current compute node ON then sends a reference information (in case of Docker containers a so-called commit ID) of the container CTG to the central master node MN for further processing. The reference information comprises an information about the storage location of a container information CI, comprising at least the current state of the container CTG. The container information CI is stored in the database DB.

5. The agent process 15 of the central master node MN then sends an instruction to the target node TN to start the container CTG with the same specification as it was obtained from current compute node ON in step 3. In addition, the agent process 15 of the central master node MN sends the reference information of the container CTG received in step 4 from the current compute node ON as well as the deployment file DF.

Having received the reference information, the target compute node TN is able to retrieve the container information CI as well as the container itself by using the information contained in the deployment file DF. This enables restarting of the container CTG on the target compute node TN.

6. Once the target compute node TN has started the container CTG on it, the agent process 16 of the target compute node TN sends a message to the agent process 15 of the central master node MN which then informs the current compute node ON for stopping the container CTG, i.e. C1 on it.

FIG. 3 illustrates a flow chart of a method for migration of containers in a container orchestration platform between compute nodes CN of a seamless computing platform SCP.

In step S1, the state of the compute nodes CN of the seamless computing platform SCP is continuously monitored. In step S2, on determining a trigger, a container CTG to be moved from a current compute node ON to a target compute node TN among a number of compute nodes CN is identified. In step S3, a container context CI of the container CT to be moved is generated. For stateless containers, the container context CI comprises only of the deployment instructions (a deployment manifest in case of Kubernetes) and for stateful containers a pointer to the state of the container saved in a database in addition. As it also requires feedback from the actual container, it would be beneficial to generate this container context CI in the compute node and transfer this to the target node TN, either via the master or directly. In step S4, the container context CI is received at the target node TN and is used for bringing up the container in its original state. Once the container is up, an intimation is passed to the master node about the same. In step S5, the master node communicates with the current node about the successful (re)initialization of the container in the target node. The current node then shuts down its replica of the container.

Using this approach, the file system of the container CTG can be saved and restored in a different compute node. However, the state of the physical memory of the container CTG and process execution stages are not saved. This can be achieved by sending a signal by the agent process 16 of the current compute node ON to the container CTG informing it about its move. The relevant state of the container CTG is saved. After that, the node agent 16 of the current compute node ON is triggered to initiate the move.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for migration of containers in a container orchestration platform between compute nodes of a seamless computing platform, the method comprising:
   continuously monitoring, by a central master node or distributed among the compute nodes, a state of the compute nodes of the seamless computing platform and/or of performance metrics of the running applications;
   on determining a trigger, identifying a container to be moved from a current compute node to a target compute node of a number of compute nodes;
   generating a container information of the container to be moved, the container information at least comprising a container context and a current state of the container to be moved, wherein the step of generating the container information comprises generating a reference information about a storage location of the container information, the reference information being transferred from the compute node from which the container has to be moved to the central master node;
   processing the container information to retrieve the container to be moved and the current state; and
   restarting the container on the target compute node with the current state when generating the container information.

2. The method according to claim 1, wherein the container information is generated by the compute node from which the container has to be moved and/or the container to be moved.

3. The method according to claim 1, wherein the step of generating the container information comprises saving the container information in a storage that can be accessed by all compute nodes of the seamless computing platform.

4. The method according to claim 1, wherein the step of continuously monitoring the state of the compute nodes comprises acquiring one or more of the following information:
   a respective workload of each of the compute nodes;
   resources needed to execute the container to be moved;
   migration costs associated with the migration of the container to be moved to find the target compute node; and
   mismatch of the application performance with a defined quality of service target.

5. The method according to claim 1, wherein the trigger is caused by one of the compute nodes.

6. The method according to claim 1, wherein the trigger is caused by the master node.

7. The method according to claim 1, wherein the step of restarting the container on the target compute node is carried out by the target compute node upon receiving a start command, comprising the container information and/or the reference information, from the master node.

8. The method according to claim 1, wherein the target compute node sends a confirmation to the master node after the target compute node has started the container.

9. The method according to claim 8, wherein the container to be moved is stopped on a previous compute node upon receiving a stop command from the master node.

10. The method according to claim 1, wherein the master node runs an agent process for communicating with the current and the target compute nodes.

11. The method according to claim 1, wherein the current and the target compute nodes run an agent process to receive and execute instructions in commands from the master node.

12. A piece of Software for executing the steps of a method according to claim 1, when run on a seamless computing platform.

13. A system for migration of containers in a container orchestration platform between compute nodes of a seamless computing platform, the system comprising:
   a central master node for continuously monitoring a state of the compute nodes of the seamless computing platform;

a first compute node, optionally being the master node, for identifying a container to be moved from a current compute node to a target compute node of a number of compute nodes on determining a trigger;

a second compute node, optionally being the current compute node, for generating a container information of the container to be moved, the container information at least comprising a current state of the container to be moved, wherein the step of generating the container information comprises generating a reference information about a storage location of the container information, the reference information being transferred from the compute node from which the container has to be moved to the central master node;

a third compute node, optionally being the target compute node, for processing the container information to retrieve the container to be moved and the current state; and the target compute node for restarting the container on it with the current state when generating the container information.

14. A computer program product, comprising a non-transitory computer readable hardware storage device storing a computer readable program code, the computer readable program code comprising an algorithm that when executed by a processor of a computer system implements the method of claim 1.

15. The method according to claim 1, wherein a state of a physical memory of the container to be moved is not saved.

16. The method according to claim 1, wherein the container context includes deployment instructions.

* * * * *